United States Patent [19]

Nishida et al.

[11] 3,784,446

[45] Jan. 8, 1974

[54] METHOD OF PRODUCING L-GLUTAMIC ACID BY FERMENTATION OF AROMATIC ORGANIC COMPOUNDS

[75] Inventors: Hiroshi Nishida, Yamato; Masao Yamamoto, Yatsushiro; Atsuo Kitai, Kamakura; Asaichiro Ozaki, Tokyo; Yukio Nishimura, Kamakura; Hiroto Takemi; Chimo Takemi, both of Yatsushiro, all of Japan

[73] Assignees: Ajinomoto Co., Inc.; Sanraku Ocean Co., Ltd., Tokyo, Japan

[22] Filed: Mar. 8, 1972

[21] Appl. No.: 232,950

Related U.S. Application Data

[63] Continuation-in-part of Ser. No. 13,830, Feb. 24, 1970, abandoned.

[30] Foreign Application Priority Data

| Mar. 11, 1969 | Japan | 44-17974 |
| Mar. 11, 1969 | Japan | 44-17975 |
| Aug. 20, 1969 | Japan | 44-65326 |
| Dec. 10, 1969 | Japan | 44-98634 |

[52] U.S. Cl.................................... 195/30, 195/49
[51] Int. Cl........................................... C12d 13/06
[58] Field of Search...................... 195/28 R, 30, 47, 195/49

[56] References Cited
UNITED STATES PATENTS

| 3,511,752 | 5/1970 | Tanaka et al. | 195/28 R |
| 3,450,599 | 6/1969 | Tanaka et al. | 195/30 |

*Primary Examiner*—Alvin E. Tanenholtz
*Attorney*—Kurt Kelman et al.

[57] ABSTRACT

L-Glutamic acid is produced by culturing glutamic acid producing strains of Brevibacterium, Corynebacterium, Microbacterium, and Micrococcus on media which provide catechol, benzyl alcohol, benzoic acid, hydroxybenzoic acid, phenylacetic acid, protocatechuic acid, phenol and other aromatic compounds as at least 70 percent (by weight) of the carbon sources available during fermentation.

8 Claims, No Drawings

METHOD OF PRODUCING L-GLUTAMIC ACID BY FERMENTATION OF AROMATIC ORGANIC COMPOUNDS

This application is a continuation-in-part of the copending application Ser. No. 13,830, filed on Feb. 24, 1970, and now abandoned.

This invention relates to the manufacture of L-glutamic acid, and particularly to a method of producing L-glutamic acid by fermentation.

L-Glutamic acid, hereinafter referred to as glutamic acid, has been produced heretofore by culturing suitable microorganisms on culture media which contain carbohydrates, acetic acid, ethanol, and aliphatic hydrocarbons as sole or principal carbon sources.

It has now been found that glutamic acid can also be produced by fermentation of culture media in which aromatic compounds provide most, at least 70 percent of the carbon available during fermentation.

Suitable compounds are benzoic acid, benzaldehyde, benzyl alcohol, resorcinol, catechol, phenol, m- and p-hydroxybenzoic acid, gentisic acid, protocatechuic acid, 3,5-dihydroxybenzoic acid, phenylacetic acid, β-phenylpropionic acid, cinnamic acid, and their mixtures.

All the microorganisms of the genera Brevibacterium, Corynebacterium, Microbacterium, and Micrococcus which were known heretofore to produce glutamic acid by fermentation of other carbon sources have been found to metabolize at least several of the afore-mentioned aromatic compounds and to produce extracellular glutamic acid in good yields in culture media in which the aromatic compounds are the sources of at least 70 percent of the carbon available during fermentation.

The following microorganisms are preferably employed in the method of the invention:

Brevibacterium flavum — ATCC 14067
Brevibacterium divaricatum — NRRL 2311
Brevibacterium saccharolyticum — ATCC 14066
Brevibacterium lactofermentum — ATCC 13869
Brevibacterium aquapile — ATCC 23587
Microbacterium ammoniaphilum — ATCC 15354
Micrococcus glutamicus — ATCC 13032

As is shown in Table 1 hereinbelow, these microorganisms are capable of producing economically significant amounts of glutamic acid in a culture medium in which one of the afore-mentioned aromatic compounds constitutes the sole significant source of carbon. This ability is shared by the following additional microorganisms:

Corynebacterium acetoacidophilum ATCC 13870
Corynebacterium acetoglutamicum ATCC 15806
and others.

The tests whose results are shown in Table 1 were performed by fermentation of aqueous culture media which, in addition to the listed carbon sources, contained 0.2 percent $KH_2PO_4$, 0.3 percent $(NH_4)_2SO_4$, 0.05 percent $MgSO_4 \cdot 7H_2O$, 1.5 percent soybean protein hydrolyzate (Aji-eki), 3 γ/l biotin, 100 γ/l thiamine hydrochloride, 2 ppm each $Fe^{++}$ and $Mn^{++}$, and had an initial pH of 6.8. All percentage values in this specification are by weight unless stated otherwise.

40 Ml aliquots of each medium were sterilized in 500 ml Sakaguchi flasks and cultivated aerobically with shaking at 30° C. The pH was held at 7.0 – 8.0 during culturing by additions of ammonium hydroxide solution, and the carbon sources were replaced as they were being consumed. After 48 hours, the optical density (O.D.) of a specimen of each broth, diluted 20-fold, was measured at 610 mμ, and the concentration of glutamic acid was measured by assay with Lactobacillus arabinosus.

The initial concentration of benzoic acid was 2.0 percent. Phenol, resorcinal, catechol, benzaldehyde, sodium 3,5-dihydroxybenzoate, sodium phenylacetate, sodium β-phenylpropionate, and sodium cinnamate were employed at an initial concentration of 0.2 percent, and the initial concentration of benzyl alcohol, sodium meta-hydroxybenzoate, sodium para-hydroxybenzoate, sodium gentisate, and sodium protocatechuate was 0.5 percent.

The total amount added was 1 percent for phenol; 2 percent for resorcinol, 3,5-dihydroxybenzoic acid, phenylacetic acid, β-phenylpropionic acid, and cinnamic acid; 3 percent for catechol; 6 to 10 percent for benzoic acid as indicated in the Table; and 4 percent for all other compounds. The strains of microorganisms are identified in the Table by their accession numbers of the American Type Culture Commission and the Northern Regional Research Laboratory of the US Department of Agriculture as indicated above.

Table 1

| Carbon source | | Microorganism | O.D. | G.A.,g/dl |
|---|---|---|---|---|
| Phenol | | ATCC 23587 | .380 | 0.3 |
| " | | ATCC 13870 | .305 | 0.3 |
| " | | ATCC 13032 | .255 | 0.3 |
| Benzoic acid, | 6% | ATCC 14066 | .610 | 3.1 |
| " | 8% | ATCC 13869 | .533 | 3.8 |
| " | 8% | ATCC 14067 | .530 | 3.5 |
| " | 8% | NRRL 2311 | .574 | 4.8 |
| " | 8% | ATCC 23587 | .605 | 4.3 |
| " | 10% | ATCC 13032 | .583 | 3.3 |
| Benzoic acid, | 8% | ATCC 15354 | .566 | 4.1 |
| " | 8% | ATCC 15806 | .580 | 4.3 |
| " | 6% | ATCC 13870 | .488 | 2.2 |
| Resorcinol | | ATCC 13870 | .370 | 0.3 |
| " | | ATCC 13032 | .470 | 0.3 |
| Catechol | | ATCC 23587 | .540 | 0.5 |
| " | | NRRL 2311 | .490 | 0.7 |
| " | | ATCC 14067 | .385 | 0.7 |
| " | | ATCC 13869 | .445 | 0.6 |
| " | | ATCC 14066 | .440 | 0.7 |
| " | | ATCC 15354 | .420 | 0.4 |
| " | | ATCC 15806 | .330 | 0.4 |
| " | | ATCC 13870 | .540 | 0.7 |
| " | | ATCC 13032 | .530 | 0.9 |
| Benzaldehyde | | ATCC 23587 | .415 | 0.4 |
| " | | NRRL 2311 | .350 | 0.8 |
| " | | ATCC 14067 | .490 | 0.7 |
| " | | ATCC 13869 | .520 | 1.3 |
| " | | ATCC 14066 | .505 | 0.7 |

Table 1-Continued

| Carbon source | Microorganism | O.D. | G.A.,g/dl |
|---|---|---|---|
| " | ATCC 15354 | .360 | 0.9 |
| " | ATCC 13870 | .350 | 0.2 |
| " | ATCC 13032 | .480 | 1.5 |
| Benzyl alcohol | ATCC 23587 | .400 | 1.2 |
| " | NRRL 2311 | .530 | 1.3 |
| " | ATCC 14067 | .480 | 1.2 |
| " | ATCC 13869 | .610 | 1.3 |
| " | ATCC 14066 | .285 | 0.3 |
| " | ATCC 15354 | .295 | 0.5 |
| Benzyl alcohol | ATCC 13870 | .540 | 1.7 |
| " | ATCC 13032 | .575 | 1.9 |
| Metahydroxybenzoic acid | ATCC 23587 | .365 | 1.5 |
| " | NRRL 2311 | .445 | 1.0 |
| " | ATCC 14067 | .495 | 1.4 |
| " | ATCC 13869 | .465 | 1.4 |
| " | ATCC 14066 | .340 | 0.8 |
| " | ATCC 15354 | .430 | 1.5 |
| " | ATCC 15806 | .380 | 1.3 |
| " | ATCC 13870 | .490 | 1.3 |
| " | ATCC 13032 | .490 | 1.6 |
| Parahydroxybenzoic acid | ATCC 23587 | .305 | 0.5 |
| " | NRRL 2311 | .395 | 1.3 |
| " | ATCC 14067 | .440 | 1.5 |
| " | ATCC 13869 | .425 | 1.5 |
| " | ATCC 14066 | .415 | 1.3 |
| " | ATCC 15354 | .430 | 1.4 |
| " | ATCC 15806 | .310 | 1.6 |
| " | ATCC 13870 | .420 | 1.5 |
| " | ATCC 13032 | .455 | 2.0 |
| Gentisic acid | ATCC 23587 | .390 | 0.7 |
| " | NRRL 2311 | .355 | 0.8 |
| " | ATCC 14067 | .410 | 1.1 |
| " | ATCC 13869 | .440 | 1.1 |
| " | ATCC 14066 | .370 | 1.2 |
| " | ATCC 15354 | .370 | 0.8 |
| " | ATCC 13870 | .400 | 1.1 |
| " | ATCC 13032 | .430 | 1.4 |
| Protocatechuic acid | ATCC 23587 | .420 | 1.2 |
| " | NRRL 2311 | .375 | 1.1 |
| " | ATCC 14067 | .450 | 1.8 |
| " | ATCC 13869 | .455 | 1.8 |
| " | ATCC 14066 | .450 | 1.6 |
| " | ATCC 15354 | .440 | 1.6 |
| " | ATCC 15806 | .420 | 1.5 |
| " | ATCC 13870 | .380 | 1.3 |
| " | ATCC 13032 | .445 | 1.5 |
| 3,5-Dihydroxybenzoic acid | ATCC 15354 | .295 | 0.3 |
| Phenyl acetic acid | ATCC 15806 | .420 | 0.4 |
| " | ATCC 13870 | .335 | 0.3 |
| β-Phenylpropionic acid | ATCC 23587 | .270 | 0.4 |
| " | NRRL 2311 | .440 | 0.6 |
| " | ATCC 14067 | .235 | 0.3 |
| " | ATCC 13869 | .335 | 0.3 |
| " | ATCC 14066 | .290 | 0.3 |
| " | ATCC 15354 | .300 | 0.3 |
| " | ATCC 13870 | .295 | 0.4 |
| " | ATCC 13032 | .280 | 0.4 |
| Cinnamic acid | ATCC 23587 | .300 | 0.5 |
| " | ATCC 14067 | .290 | 0.3 |
| " | ATCC 13869 | .225 | 0.4 |
| " | ATCC 14066 | .390 | 0.7 |
| " | ATCC 13870 | .260 | 0.5 |
| " | ATCC 13032 | .275 | 0.4 |

A portion of the aromatic compounds, not exceeding 30 percent, may be replaced by more conventional carbon sources in the otherwise unchanged medium described above, as is shown in Table 2.

Table 2

| Carbon sources | Strain | G.A., g/dl |
|---|---|---|
| 3% catechol + 0.5% glucose | ATCC 13032 | 1.4 |
| 4% benzaldehyde + 0.8% acetic acid | ATCC 13869 | 1.4 |
| 3% benzyl alcohol + 1% glucose | ATCC 23587 | 1.4 |
| 3% benzyl alcohol + 1% ethanol | ATCC 14067 | 1.4 |
| 5% benzoic acid + 2% glucose | ATCC 14066 | 4.8 |
| 6% benzoic acid + 2% acetic acid | ATCC 13869 | 5.3 |
| 3% p-hydroxybenzoic acid + 1% ethanol | NRRL 2311 | 1.8 |
| 3% protocatechuic acid + 1% acetic acid | ATCC 23587 | 1.8 |

All aromatic compounds were present initially at a concentration of 0.3 percent and were replaced at a rate of 0.1 percent or 0.2 percent as they were being consumed, the total amounts being listed in Table 2. All glucose was added to the media at the start of fermentation, and a concentration of 0.5 percent ethanol or acetic acid was originally supplied and replenished as needed. All acids were added to the medium in the form of their sodium or ammonium salts.

Biotin and compounds having biotin activity, such as biocytin, desthiobiotin, biotin sulfoxide, 7,8-diaminopelargonic acid.2HCl, and 7-keto-8-aminopelargonic acid.HCl; affected the growth of the microorganisms and the yield of glutamic acid as is shown in Tables 3 to 8, all conditions not stated otherwise being as described with reference to Table 1, and glutamic acid (G.A.) yield being indicated in g/dl.

glutamic acid from culture media containing the aromatic compounds of the invention as the sole significant or the predominant carbon source when added at the later stages of the logarithmic growth phase in amounts suitably selected not to interfere with cell growth.

The aromatic compounds of the invention are employed at initial concentrations in which they are solu-

Table 3

| Biotin: | 3 γ/l | | 5 γ/l | | 7 γ/l | |
|---|---|---|---|---|---|---|
| | O.D. | G.A. | O.D. | G.A. | O.D. | G.A. |
| Benzoic acid 12% ATCC 13869 | .72 | 4.75 | .81 | 6.21 | .90 | 6.03 |
| Benzoic acid 10% ATCC 23587 | .55 | 3.01 | .63 | 3.82 | .67 | 3.25 |
| Benzoic acid 10% ATCC 15354 | .70 | 4.23 | .74 | 4.38 | .78 | 4.56 |
| Benzoic acid 12% ATCC 13870 | .65 | 4.16 | .78 | 5.87 | .80 | 5.79 |
| Benzoic acid 12% ATCC 13032 | .68 | 4.18 | .80 | 5.93 | .85 | 6.02 |
| p-Hydroxyb.a. 6% NRRL 2311 | .47 | 3.06 | .55 | 3.42 | .61 | 3.18 |
| p-Hydroxyb.a. 6% ATCC 23587 | .36 | 1.20 | .43 | 1.65 | .49 | 1.92 |

Table 4

| Biocytin: | 6 γ/l | | 8 γ/l | | 10 γ/l | |
|---|---|---|---|---|---|---|
| | O.D. | G.A. | O.D. | G.A. | O.D. | G.A. |
| Benzoic acid 12% ATCC 14067 | .70 | 4.57 | .76 | 5.47 | .78 | 5.21 |
| Benzoic acid 12% ATCC 13032 | .73 | 4.48 | .80 | 6.02 | .82 | 6.05 |
| p-Hydroxyb.a. 8% ATCC 13869 | .46 | 3.70 | .52 | 4.12 | .57 | 4.00 |
| p-Hydroxyb.a. 6% ATCC 13870 | .54 | 2.58 | .58 | 3.26 | .61 | 3.21 |

Table 5

| Desthiobiotin: | 6 γ/l | | 8 γ/l | | 10 γ/l | |
|---|---|---|---|---|---|---|
| | O.D. | G.A. | O.D. | G.A. | O.D. | G.A. |
| Benzoic acid 10% NRLL 2311 | .68 | 3.80 | .80 | 4.32 | .85 | 3.87 |
| Benzoic acid 10% ATCC 15354 | .69 | 4.03 | .75 | 4.25 | .78 | 4.32 |
| Benzyl alc. 4% ATCC 14066 | .44 | 0.95 | .52 | 1.23 | .60 | 1.25 |
| Benzyl alc. 6% ATCC 13870 | .53 | 2.01 | .60 | 3.16 | .62 | 3.03 |

Table 6

| Biotin sulfoxide: | 4 γ/l | | 6 γ/l | | 8 γ/l | |
|---|---|---|---|---|---|---|
| | O.D. | G.A. | O.D. | G.A. | O.D. | G.A. |
| Benzoic acid 10% ATCC 14066 | .63 | 3.82 | .70 | 4.38 | .83 | 4.32 |
| Benzoic acid 10% ATCC 15354 | .65 | 3.65 | .72 | 4.10 | .79 | 4.16 |
| m-Hydroxyb.a. 8% ATCC 23587 | .57 | 3.11 | .61 | 3.67 | .68 | 3.44 |
| m-Hydroxyb.a. 8% ATCC 13032 | .55 | 2.66 | .60 | 3.78 | .61 | 3.81 |

Table 7

| 7,8-Diaminopelarg.ac.2HCl | 0.1 mg/l | | 0.2 mg/l | | 0.5 mg/l | |
|---|---|---|---|---|---|---|
| | O.D. | G.A. | O.D. | G.A. | O.D. | G.A. |
| Benzoic acid 12% ATCC 13869 | .69 | 4.21 | .84 | 5.85 | .92 | 5.43 |
| Benzoic acid 12% ATCC 13032 | .70 | 4.35 | .84 | 5.50 | .88 | 5.00 |
| Benzyl alc. 4% ATCC 14066 | .45 | 1.27 | .51 | 1.62 | .55 | 1.09 |
| Benzyl alc. 6% ATCC 13032 | .51 | 2.55 | .60 | 3.25 | .68 | 2.31 |

Table 8

| 7-Keto-8-aminopel.ac.HCl | 0.4 mg/l | | 0.6 mg/l | | 0.8 mg/l | |
|---|---|---|---|---|---|---|
| | O.D. | G.A. | O.D. | G.A. | O.D. | G.A. |
| Benzoic acid 10% ATCC 23587 | .62 | 3.25 | .66 | 4.13 | .69 | 3.72 |
| Benzoic acid 10% ATCC 13870 | .60 | 3.95 | .67 | 4.30 | .71 | 4.01 |
| m-Hydroxyb.a. 6% NRRL 2311 | .46 | 2.22 | .51 | 2.87 | .56 | 2.76 |
| m-Hydroxyb.a. 6% ATCC 15354 | .49 | 2.61 | .54 | 3.19 | .60 | 2.95 |

As is known to occur with more conventional carbon sources, surfactants such as polyoxyethylenesorbitan monostearate, polyethyleneglycol monooleate, stearic acid, oleic acid, and the like can improve the yield of ble in the culture medium at the necessary pH, and it is most convenient to add those which are acids in the form of their sodium or ammonium salts. The amounts initially present in the medium are chosen so as not to inhibit cell growth and vary thus between 0.1 percent and 5.0 percent depending on the nature of the aromatic compound and the microorganism employed. If not the entire desired amount can be added to the medium initially, the aromatic compounds are replenished intermittently or continuously as they are being consumed.

A wide variety of suitable nitrogen sources is available and they include urea, aqueous ammonia, the ammonium salts or sulfuric, hydrochloric, carbonic, and nitric acid, and the entire amount of the nitrogenous material may be added at once to the medium in certain cases. However, a high concentration of ammonium ions enhances the inhibitory effect of the aromatic compounds on cell growth.

The necessary inorganic ions are provided by potassium phosphate, magnesium sulfate, small amounts of iron and manganese compounds, and the like. Organic growth promoters other than those described above include corn steep liquor, soybean protein hydrolyzate, bouillon, pepton, yeast extract, and other materials rich in organic nitrogen compounds.

An initial pH of approximately 7.2 is preferred, and a pH value of 6 – 9 is to be maintained during fermentation which is preferably carried out under aerobic conditions between 25° and 37° C. The glutamic acid is recovered from the culture broth in any conventional manner.

The following Examples further illustrate the method of the invention.

EXAMPLE 1

B. lactofermentum ATCC 13869 was inoculated in one liter of an aqueous culture medium containing 2.0 percent sodium p-hydroxy-benzoate, 0.3 percent ammonium sulfate, 0.1 percent $KH_2PO_4$, 0.1 percent $K_2HPO_4$, 0.02 percent $MgSO_4 \cdot 7H_2O$, 1.0 percent Aji-eki, 5 ppm $Fe^{++}$, 5 ppm $Mn^{++}$, 2 $\gamma$/l biotin, and 100 $\gamma$/l thiamine hydrochloride.

The aerobic culture was agitated at 30° C and kept at pH 7.8 by additions of ammonium hydroxide solution. 2 percent p-Hydroxy-benzoic acid in the form of its crystalline ammonium salt was added 6, 11, 16, and again 20 hours after inoculation. The glutamic acid concentration in the medium reached 5.3 g/dl after 32 hours.

EXAMPLE 2

Sodium benzoate was substituted for the sodium p-hydroxy-benzoate in the culture medium of Example 1, and the modified medium was inoculated with C.acetoacidophilum ATCC 13870. The cultivation was carried out aerobically with agitation at an initial temperature of 31° C. The temperature was lowered to 28° C during later stages when a 45 percent solution of sodium benzoate was supplied continuously at a rate to maintain a benzoic acid concentration of approximately 0.5 percent, and ammonium hydroxide solution to keep the pH at 7.9 while also providing assimilable nitrogen.

A total amount of 92 g benzoic acid was made available per liter of medium over 34 hours, and the glutamic acid formed amounted to 7.5 g/dl. The volume of the medium increased by 20 percent due to the additions made.

EXAMPLE 3

Microbacterium ammoniaphilum ATCC 15354 was inoculated on an aqueous medium containing 0.3 percent benzyl alcohol, 0.1 percent ammonium sulfate, 0.2 percent urea, 0.1 percent $KH_2PO_4$, 0.05 percent $MgSO_4 \cdot 7H_2O$, 1.5 percent Aji-eki, 2 ppm $Fe^{++}$, 2 ppm $Mn^{++}$, 100 $\gamma$/l thiamine hydrochloride, and 0.5 mg/l 7-keto-8-aminopelargonic acid hydrochloride.

After 18 hours of cultivation on a shaker at 30° C, 5 percent of the seed culture so prepared was inoculated in a fresh medium of the same composition, and the fermentation was carried out aerobically with agitation at 29° C. Benzyl alcohol was replenished 15 times at a rate of 0.3 percent during 40 hours according to its consumption, and the pH was held at 7.8 by adding ammonium hydroxide solution. The ultimate glutamic acid concentration was 1.93 g/dl.

EXAMPLE 4

In the medium of Example 1, the sodium p-hydroxybenzoate was replaced by 0.4 percent sodium protocatechuate, and the modified medium was inoculated with Microbacterium ammoniaphilum ATCC 15354. The culture was held on a shaker at 28° C, and sodium protocatechuate was fed at a rate of 0.4 percent eight times to replace the consumed compound. When the optical density of a broth sample diluted to 20 times its volume reached 0.4, 0.05 percent polyoxyethylene-sorbitan monostearate was added. The medium was kept at pH 7.5 by additions of a dilute ammonium hydroxide solution. After 48 hours, 2.4 g/dl glutamic acid had accumulated in the medium.

EXAMPLE 5

An aqueous medium containing 2.0 percent sodium m-hydroxybenzoate, 0.3 percent ammonium sulfate, 0.1 percent $KH_2PO_4$, 0.1 percent $K_2HPO_4$, 0.02 percent $MgSO_4 \cdot 7H_2O$, 3 ppm $Fe^{++}$, 3 ppm $Mn^{++}$, 1.0 percent corn steep liquor, and 100 $\gamma$/l thiamine hydrochloride was inoculated with Brevibacterium aquapile ATCC 23587, and the culture was agitated and aerated at 28° while the pH was held at 7.8 by additions of ammonium hydroxide solution. Crystalline ammonium m-hydroxybenzoate equivalent to 2 percent m-hydroxybenzoic acid was added after 6, 11, 16, and 20 hours to replace the consumed carbon source. After 32 hours of cultivation, the glutamic acid concentration in the medium reached 2.6 g/dl.

The broth (500 ml) was then centrifuged to remove the microbial cells, and the supernatant was partly evaporated to make it supersaturated with glutamic acid when its pH was adjusted to 3.2 with hydrochloric acid. The precipitated crude glutamic acid crystals were purified by carbon treatment, and 10.2 g L-glutamic acid sufficiently pure for conversion to monosodium glutamate was recovered.

What is claimed is:
1. A method of producing L-glutamic acid which comprises:
   a. inoculating a microorganism into a nutrient medium containing available sources of assimilable carbon and of assimilable nitrogen, and minor nutrients,
      1. said microorganism being a strain of Brevibacterium, Corynebacterium, Microbacterium, or Micrococcus capable of assimilating said source of carbon and of producing L-glutamic acid therefrom;
   b. culturing said microorganism in said medium until a portion of said source of carbon is consumed and L-glutamic acid is accumulated in said medium; and c. recovering the accumulated L-glutamic acid,
  1. at least 70 percent by weight of said source of assimilable carbon available in said medium during said culturing being constituted by at least one aromatic compound selected from the group consisting of benzoic acid, benzaldehyde, benzyl alcohol, resorcinol, catechol, phenol, meta-hydroxybenzoic acid, para-hydroxybenzoic acid, gentisic acid, protocatechuic acid, 3,5-dihydroxy-benzoic acid, phenylacetic acid, β-phenylpropionic acid, and cinnamic acid.

2. A method as set forth in claim 1, wherein the initial concentration of said at least one aromatic compound in said medium is between 0.1 percent and 5.0 percent, and said medium is replenished with said aromatic compound as the latter is being consumed.

3. A method as set forth in claim 2, wherein a carbohydrate, acetic acid, or ethanol constitutes an additional portion of said source of assimilable carbon.

4. A method as set forth in claim 2, wherein said medium contains a small amount of a substance having biotin activity sufficient to increase the amount of said accumulated L-glutamic acid.

5. A method as set forth in claim 2, wherein said at least one aromatic compound is benzoic acid.

6. A method as set forth in claim 1, wherein said at least one aromatic compound constitutes the sole significant source of carbon in said nutrient medium.

7. A method as set forth in claim 1, wherein said microorganism is capable of producing economically significant amounts of glutamic acid in a culture medium in which said at least one aromatic compound constitutes the sole significant source of carbon.

8. A method as set forth in claim 7, wherein said microorganism is a member of the group consisting of Brevibacterium flavum ATCC 14067, Brevibacterium divaricatum NRRL 2311, Brevibacterium saccharolyticum ATCC 14066, Brevibacterium lactofermentum ATCC 13869, Brevibacterium aquapile ATCC 23587, Microbacterium ammoniaphilum ATCC 15354, Micrococcus glutamicus ATCC 13032, Corynebacterium acetoacidophilum ATCC 13870, and Corynebacterium acetoglutamicum ATCC 15806.

* * * * *